Feb. 13, 1945     E. B. SHERMAN     2,369,415

METHOD OF REPAIRING CRACKED CYLINDER HEADS AND BLOCKS

Filed Oct. 5, 1943

Edgar B. Sherman
INVENTOR.

BY *C. A. Snow & Co.*
ATTORNEYS.

Patented Feb. 13, 1945

2,369,415

UNITED STATES PATENT OFFICE 2,369,415

METHOD OF REPAIRING CRACKED CYLINDER HEADS AND BLOCKS

Edgar B. Sherman, Darlington, S. C.

Application October 5, 1943, Serial No. 505,065

1 Claim. (Cl. 29—148)

This invention relates to a method of repairing cracked cylinder heads and blocks, the primary object of the invention being to provide a method of repairing cylinder heads or blocks expeditiously, restoring the damaged cylinder head or block, for further use, and eliminating the necessity of dismantling the engine to make the repair.

Another object of the invention is to provide a method of repairing cracked cylinder heads and blocks, which will produce a smooth and even surface at the point of repair, completely concealing the damaged portion.

Still another object of the invention is to provide a method of this character which will produce a repair job that will not be affected by the expansion and contraction of the metal of which the cylinder head or block is constructed.

Referring to the drawing.

Figure 1:
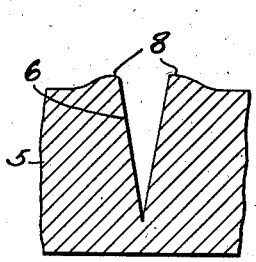
Figure 1 is a sectional view illustrating the shape of the crack in a cylinder head, after the first step of the method has been completed.

Referring to the drawing in detail, in carrying out the method of repair in accordance with the present invention, the cylinder head or block under repair, which in the present showing is indicated by the reference character 5, is subjected to heat of from approximately 475 degrees Fahrenheit, to 500 degrees Fahrenheit.

Figure 2:
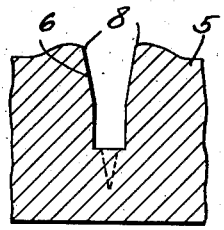
Figure 2 is a sectional view through a cylinder head showing the result on the walls of the cracked portion of the cylinder head, after the second step of the method has been completed.

With the cylinder head or block in a heated condition, a wedge-shaped tool is driven into the upper end of the crack of the cylinder head or block, which is indicated at 6, spreading the walls of the crack 6, to the position as shown by Figure 1 of the drawing. A straight edge tool is now driven between the walls of the crack 6, and portions of the walls are cut away, the portions cut away being forced into the bottom of the crack, filling the bottom of the crack being repaired, as indicated in dotted lines, and forming a crack having a wide bottom, as shown by Figure 2 of the drawing.

Figure 3:
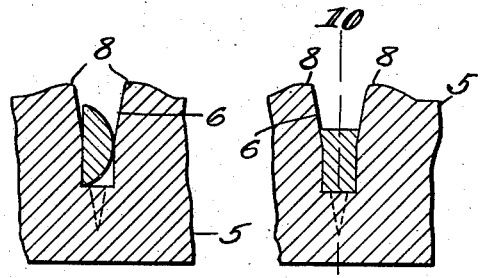
Figure 3 is a sectional view through the cylinder head illustrating the third step of the method.
Figure 4:
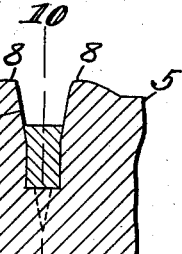
Figure 4 is a sectional view through the cylinder head and back portion thereof, illustrating the result after the fourth step of the method has been completed.
Figure 5:
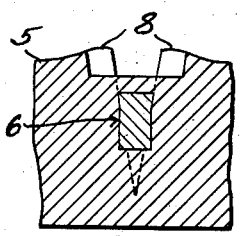
Figure 5 is a sectional view through the cylinder head and crack, after the tying in step of the method has been completed.

A filler bar, comprising a length of malleable metal having a straight edge and a curved edge, is now positioned in the crack, the filler bar resting on the bottom of the crack 6, in a manner as shown by Figure 3 of the drawing. When the filler bar has been properly positioned, a straight edge tool is positioned against the upper edge of the filler bar and struck with a heavy hammer, to flatten the metal filler bar in the bottom of the crack 6, causing the filler bar to take the shape as shown by Figure 4 of the drawing.

With the filler bar securely pressed within the bottom of the crack being repaired, a straight edge tool is positioned transversely of the upper end of the crack, and the tool is repeatedly struck, driving a portion of the metal of the cylinder head adjacent to the crack being filled, into engagement with the filler bar, tying the filler bar within the crack in such a manner as to insure against displacement or separation from the walls of the crack, due to expansion and contraction.

It might be further stated, that in carrying out the first step of the method which involves the spreading of the walls of the crack to a substantially V-form, the portions of the metal at the upper end of the crack, become raised as indicated at 8 leaving a surplus of metal at the upper end of the crack, to be forced into the upper end of the crack, above the filler bar.

Figure 6:
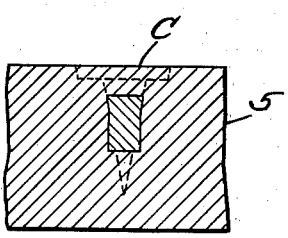
Figure 6 is a sectional view through the cylinder head after the completion of the repair of the cylinder head, by the method involving this invention.
Figure 7:
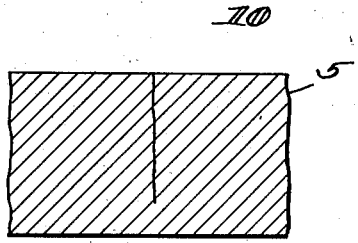
Figure 7 is a sectional view through a cylinder head illustrating the crack in the cylinder head, to be repaired.
Figure 8:
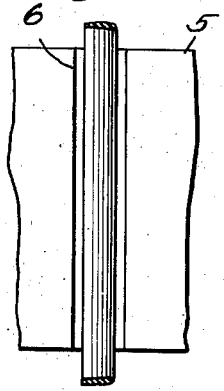
Figure 8 is a plan view illustrating the crack in a cylinder head to be repaired, as shaped to receive the fill-in bar, the fill-in bar being shown as positioned within the crack.
Figure 9:
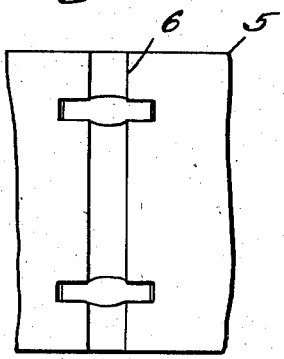
Figure 9 is a plan view illustrating the upper surface of the cylinder block adjacent to the crack repaired.
Figure 10:
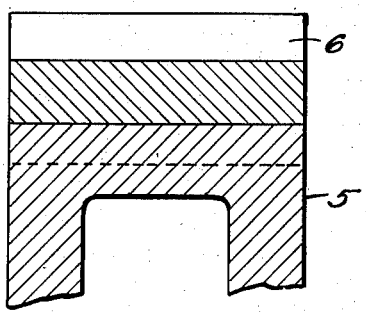
Figure 10 is a sectional view taken on line 10—10 of Figure 4.

The tool having a rounded or curved head is now positioned with the head against the enlarged portion 8, and the tool is repeatedly struck with a hammer, causing the enlarged portions at the end of the crack to become flattened as shown at C in Figure 6 of the drawing, providing a repair job for cracked cylinder heads or blocks, which will be smooth and strong, leaving no indication of the repair having been made, and at the same time insuring an exceptionally strong repair job.

What is claimed is:

The method of repairing cracked cylinder heads and blocks, consisting in subjecting the cylinder head to heat, of substantially 500° F., spreading the walls of the crack to substantially V-shape while the cylinder head is in a heated condition, forcing portions of the walls of the V-shaped crack into the bottom of the crack providing right angled surfaces at the bottom of the crack, placing a filler bar having a curved surface and a straight surface, within the bottom of the crack subjecting the filler bar to pressure to form the filler bar into the shape of the bottom of the crack, pressing portions of the cylinder head into engagement with the filler bar, tying the filler bar within the crack, and finally directing pressure to the cylinder block adjacent to the edges of the crack, forcing the walls of the crack together, completely covering the filler bar.

EDGAR B. SHERMAN.